Figure 1:
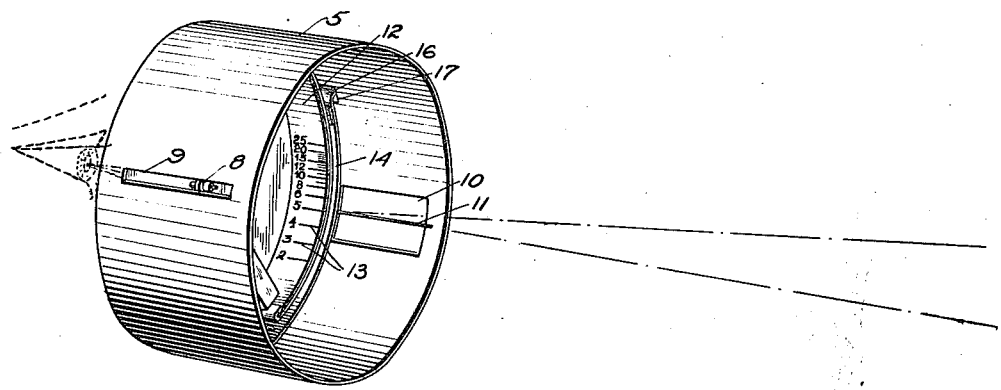

A. W. CHURCH.
DISTANCE FINDER.
APPLICATION FILED JULY 13, 1915.

1,209,395.

Patented Dec. 19, 1916.

WITNESSES
L. Hauerstein
E. B. Marshall

INVENTOR
Arthur W. Church
BY 
ATTORNEYS

UNITED STATES PATENT OFFICE.

ARTHUR W. CHURCH, OF JEFFERSON CITY, MONTANA, ASSIGNOR OF ONE-HALF TO CLARENCE C. SINNOTT, OF JEFFERSON CITY, MONTANA.

DISTANCE-FINDER.

1,209,395.  Specification of Letters Patent.  Patented Dec. 19, 1916.

Application filed July 13, 1915. Serial No. 39,617.

*To all whom it may concern:*

Be it known that I, ARTHUR W. CHURCH, a citizen of the United States, and a resident of Jefferson City, in the county of Jefferson and State of Montana, have invented a new and Improved Distance-Finder, of which the following is a full, clear, and exact description.

My invention has for its object to provide a distance finder which is particularly valuable for photographers using focusing cameras, the distance finder being constructed with a hollow body having two sighting places which the user may with his eye, bring into alinement with the base of the object, substantially on a level with the user's feet, when a pendulum having distances marked thereon, will swing to a point where a distance mark on the pendulum will be disposed adjacent a mark on the body which will indicate the distance of the object. The distance marks on the pendulum will be indicated with reference to the height of the user of the distance finder.

Additional objects of the invention will appear in the following specification in which the preferred form of my invention is disclosed.

In the drawings similar reference characters refer to similar parts in all the views in which—

Figure 2:
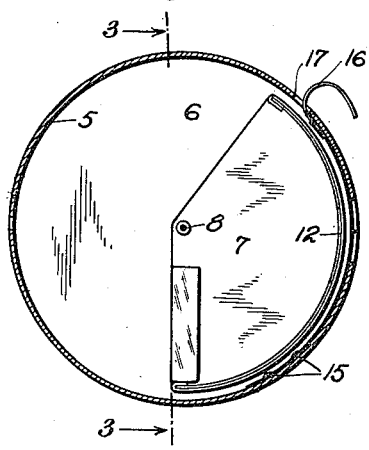
Figure 3:
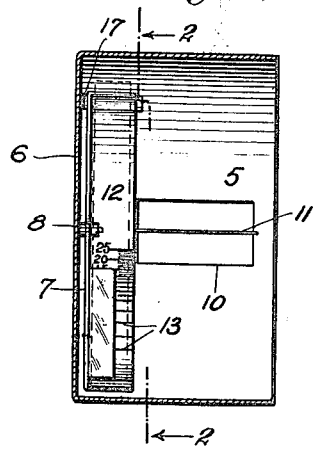
Figure 4:
Figure 4:

Figure 1 is a perspective view showing my distance finder; Fig. 2 is a sectional view on the line 2—2 of Fig. 3; Fig. 3 is a sectional view on the line 3—3 of Fig. 2; and Fig. 4 is a view showing a flattened flange before it is open and is attached to the pendulum.

By referring to the drawings it will be seen that the distance finder is provided with a hollow cylindrical body 5, this body having a head 6 to which a pendulum 7 is pivoted at 8. In the side of the body there is an opening 9 and a second opening 10 which is spaced from the opening 9 and is disposed at the other side of the cylindrical body 5. These openings 9 and 10 are provided for sighting purposes, the opening 10 having a cord 11 disposed transversely of the body across the said opening. The pendulum 7 is provided with a flange 12 which is curved concentrically with the cylindrical body 5 and with the pivot 8 as its center so that when the pendulum 7 rocks on its pivot the flange 12 will move adjacent the opening 10 and the cord 11 disposed thereacross. On this curved flange 12 there are markings 13, the relationship of which relatively to the cord 11, will indicate the distance of the object when the finder is used.

To ascertain the distance of an object the operator should stand erect and hold the open side of the body to the right, the operator then sighting through the opening 9 and bringing the cord 11 in the opening 10 and into alinement with the base of the object, substantially on a level with the feet of the operator. As the operator stands erect the line from the eye of the operator through the opening 9 and at the cord 11 to the base of the object, will be the hypotenuse of a right-angled triangle, and this being so, it is possible to mark the distances on the curved flange 12, so that they will accurately indicate the distance of the object.

As a means to hold the pendulum 7 in position relatively to the body 5, a brake 14 is provided, this brake 14 being in the form of a spring secured within the cylindrical body 5 at 15. When the terminal 16 is pressed inwardly through the opening 17, in the side of the body, the spring will engage the flange 12 to hold the said flange and pendulum in position as long as desired.

Having thus described my invention I claim as new and desire to secure by Letters Patent:

1. In a distance finder, a body having two sighting places spaced apart, and a pendulum pivoted to the body intermediate of the sighting places and having distance marks indicated thereon around the axis of the pendulum, the distance marks being disposed in front of one of the sighting places and at one side of the plane extending from one sighting place to the other, for observation through a sighting place.

2. In a distance finder, a hollow body having two sighting openings, and a pendulum mounted in the body, there being distance marks on the pendulum around the axis of the pendulum for observation through one of the sighting openings.

3. In a distance finder, a hollow body having two sighting openings, a pendulum mounted in the body, there being distance marks on the pendulum around the axis of the pendulum, for observation through one of the sighting openings, and a brake for holding the pendulum relatively to the body.

4. In a distance finder, a hollow body having two sighting openings spaced apart in its sides, and a pendulum mounted in the body, for observation through a sighting opening for indicating distances by the relationship of its position relatively to the body.

5. In a distance finder, a hollow body having two sighting openings spaced apart in its sides, and a pendulum mounted in the body and provided with a flange for moving adjacent one of the openings, there being distance marks indicated on the flange for observation through a sighting opening.

6. In a distance finder, a cylindrical body having a head and two sighting openings spaced apart in its sides, and a pendulum disposed within the body and pivoted to the head, there being distance marks indicated on the pendulum for observation through a sighting opening.

7. In a distance finder, a cylindrical body having a head and two sighting openings spaced apart in its sides, a pendulum disposed within the body and pivoted to the head, and a curved flange on the pendulum for moving adjacent one of the openings, there being distance marks indicated on the flange for observation through a sighting opening.

8. In a distance finder, a cylindrical body having a head and two sighting openings in its sides, a pendulum disposed within the body and pivoted to the head, a curved flange on the pendulum for moving adjacent one of the openings, there being distance marks indicated on the flange for observation through a sighting opening, and a brake for holding the pendulum relatively to the body.

9. In a distance finder, a cylindrical body having a head and two sighting openings spaced apart in its sides, a pendulum disposed within the body and pivoted to the head, and a curved flange on the pendulum for moving adjacent one of the openings, there being distance markings on the inside of the flange, for the purpose specified.

10. In a distance finder, a cylindrical body having a head and two sighting openings spaced apart in its sides, a pendulum disposed within the body and pivoted to the head, a curved flange on the pendulum for moving adjacent one of the openings, there being distance marks indicated on the inside of the flange for the purpose specified, and a brake for holding the pendulum relatively to the body.

11. In a distance finder, a cylindrical body having a head at one end and two sighting openings in its sides, a cord disposed transversely of the body across one of the openings, a pendulum within the body and pivoted to the head, a curved flange on the pendulum for moving adjacent the opening having the cord thereacross, there being distance markings on the flange for the purpose specified.

12. In a distance finder, a body having two sighting places spaced apart, and a pendulum pivoted to the body intermediate of the sighting places in a position such as not to entirely obstruct the view between said sighting places and having distance marks indicated thereon around the axis of the pendulum, the distance marks being disposed in front of one of the sighting places for observation through the other sighting place.

13. In a distance finder, a hollow body having two sighting openings spaced apart in its sides, and a pendulum mounted in the body and provided with a member for moving adjacent one of the openings, there being distance marks indicated on the member for observation through a sighting opening.

14. In a distance finder, a cylindrical body having a head and two sighting openings spaced apart in its sides, a pendulum disposed within the body and pivoted to the head, and a curved member on the pendulum for moving adjacent one of the openings, there being distance marks indicated on the member for observation through a sighting opening.

15. In a distance finder, a cylindrical body having a head and two sighting openings in its sides, a pendulum disposed within the body and pivoted to the head, a curved member on the pendulum for moving adjacent one of the openings, there being distance marks indicated on the member for observation through a sighting opening, and a brake for holding the pendulum relatively to the body.

16. In a distance finder, a cylindrical body 125 having a head and two sighting openings spaced apart in its sides, a pendulum disposed within the body and pivoted to the head, and a curved member on the pendulum for moving adjacent one of the openings, there being distance markings on the inside of the member, for the purpose specified.

17. In a distance finder, a cylindrical body having a head and two sighting openings spaced apart in its sides, a pendulum disposed within the body and pivoted to the head, a curved member on the pendulum for moving adjacent one of the openings, there being distance marks indicated on the inside of the member for the purpose specified, and a brake for holding the pendulum relatively to the body.

In testimony whereof I have signed my name to this specification in the presence of the two subscribing witnesses.

ARTHUR W. CHURCH.

Witnesses:
 ENG. BRINDJOUR,
 M. A. JOHNSON.